Oct. 7, 1930.　　J. P. HARTWIG　　1,777,562
STEERING MECHANISM FOR TRAILERS
Filed May 11, 1929
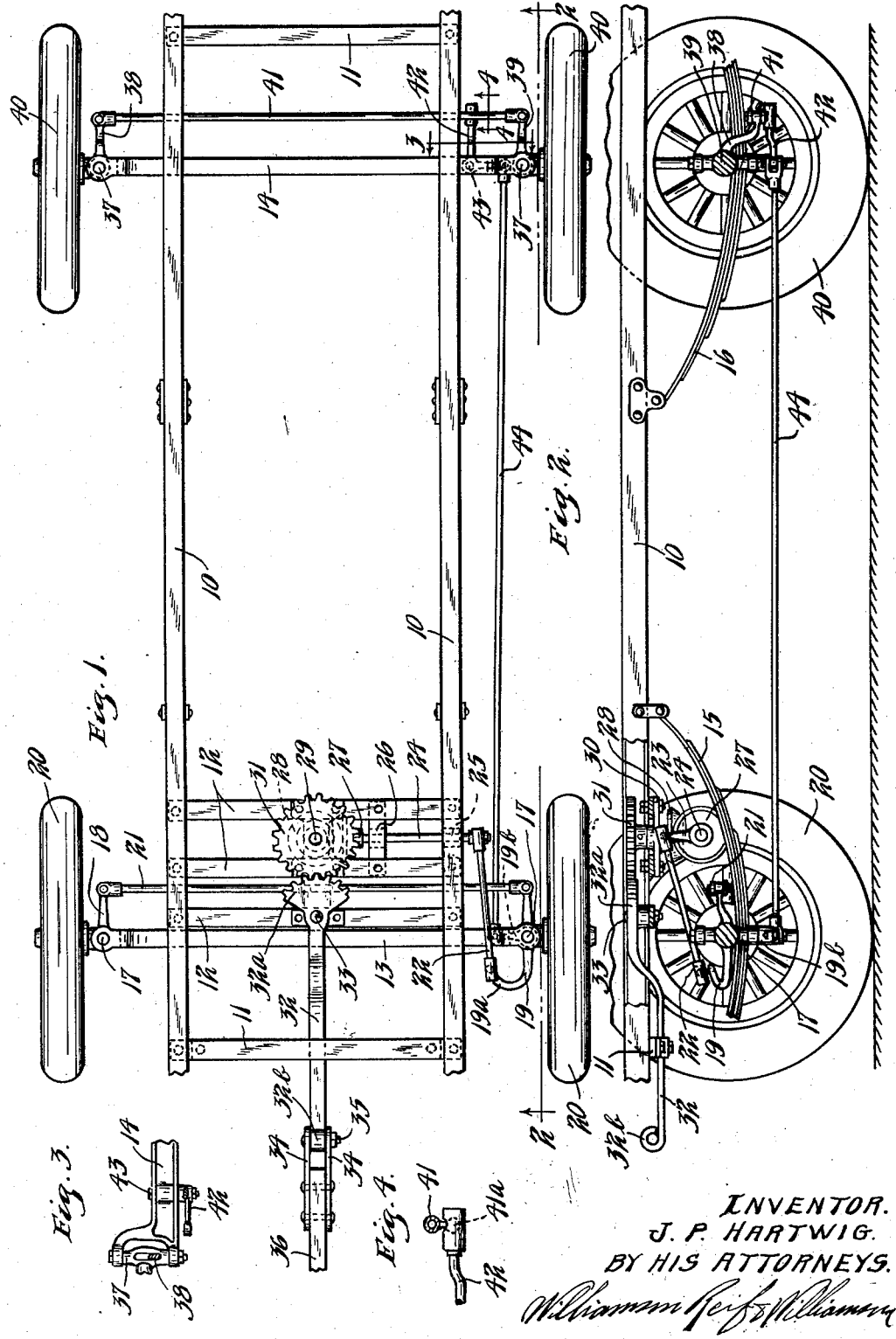
INVENTOR.
J. P. HARTWIG.
BY HIS ATTORNEYS.

Patented Oct. 7, 1930

1,777,562

UNITED STATES PATENT OFFICE

JULIUS P. HARTWIG, OF MINNEAPOLIS, MINNESOTA

STEERING MECHANISM FOR TRAILERS

Application filed May 11, 1929. Serial No. 362,430.

This invention relates to a steering mechanism and particularly to the steering mechanism of a vehicle such as a trailer. Trailers are now coming into extensive use, both for the carrying of merchandise and for carrying passengers. It is well known that where one or more vehicles are being drawn as trailers by a power vehicle and a corner is turned that the pulling vehicle must swing around the corner on a very wide circle and some distance therefrom in order to have the trailers get around the corner and not move across the corner. It is often impossible on account of traffic conditions for the pulling vehicle to make a curve which will insure that the trailers will swing around the corner and even if a wide curve is made, many times the trailers will cut the corner. It is desirable to have some means which will turn the wheels on the trailers when a corner is turned to cause the trailers to swing around the corner in a proper path.

It is an object of this invention, therefore, to provide a steering means for a trailer by means of which the front and rear wheels will be turned when the trailer is pulled around a corner so that the wheels will follow the desired path and not cut across the corner.

It is a further object of the invention to provide a trailer vehicle comprising a frame and front and rear axles and having a member by which it is drawn with gear means connected thereto cooperating with gear means on the frame of the vehicle for turning a transversely extending shaft, said vehicle having members with wheel carrying spindles journaled at each end of said axles, a link connecting said transversely extending shaft and one of the said members on the front axle and a link extending from one of said members on the front axle to one of said members on the rear axle.

It is still another object of the invention to provide a vehicle having a frame and front and rear axles, members with wheel-carrying spindles journaled at the ends of each of said axles, means connecting said members at the rear axle to cause the same to move in unison, means connecting said members at the front axle to cause the same to move in unison, a bell crank lever journaled on the rear axle and having one end connected to the means connecting the members having the wheel-carrying spindles at the rear axle and having its other end connected to a link extending forwardly and connected at its forward end to one of the members having the wheel-carrying spindles at the front axle, together with means for drawing said vehicle and swinging the members having the wheel-carrying spindles at the front axle.

These and other objects and advantages of the invention will be fully set forth in the following description made in connection with the accompanying drawings, in which like reference characters refer to similar parts throughout the several views, and in which:—

Fig. 1 is a plan view of the frame and parts carried thereby of the vehicle;

Fig. 2 is a vertical section taken on line 2—2 of Fig. 1 as indicated by the arrows;

Fig. 3 is a vertical section taken on line 3—3 of Fig. 1 as indicated by the arrows; and Fig. 4 is a vertical section taken on line 4—4 of Fig. 1 as indicated by the arrows.

Referring to the drawings, a vehicle is shown having a frame comprising the longitudinally extending side members 10, the transversely extending end members 11 and intermediate transversely extending members 12. A front axle 13 and a rear axle 14 are provided which will be connected to the springs 15 and 16 respectively, which springs are connected to the frame members 10 by suitable brackets or shackles.

The front axle has vertically spaced bearings at each end between which are journaled on vertical pivots 17 spindle carrying members or knuckles 18 and 19. Front wheels 20 are journaled respectively on the outwardly extending spindles of members 18 and 19. Members 18 and 19 have rearwardly projecting arms which are pivotally connected to the ends of a link 21 extending between and connecting said arms. Member 19 has a forwardly extending arm 19$^a$ which is curved rearwardly and connected by a ball and socket joint to the forward end of a link rod 22 which extends from arm 19ª upwardly and rearwardly and is connected at its other end by a ball and socket joint to the end of an upwardly extending arm 23 having a hub rigidly secured to a shaft 24 extending transversely of the frame and journaled in a bearing 25 depending from the side frame member 10 and a bearing 26 depending from and secured to a pair of the cross frame members 12. Shaft 24 has a beveled gear 27 secured to its inner end meshing with another beveled gear 28 secured to the lower end of a vertically extending shaft 29 journaled in a bearing 30 secured to a pair of the cross members 12, said vertical shaft having secured to its upper end a spur gear 31. A member 32 forming a draw bar for the vehicle is pivoted on a vertical pivot 33 carried by one of the cross members 12 and has a gear segment 32ª at its rear end meshing with gear 31. Bar 32 at its front end has an eyelet 32ᵇ with a horizontal axis which has disposed at either side thereof, the plates 34, a headed and nutted bolt 35 extending through said plates and the eyelet 32ᵇ. Plates 34 are shown as rigidly riveted to another draw bar or tongue 36, which may form part of or be connected to the pulling vehicle.

The rear axle also has spaced bearings at its end between which are pivoted on vertical pivots 37 spindle carrying members 38 and 39. Rear wheels 40 are carried on the spindles of members 38 and 39. Members 38 and 39 have rearwardly extending arms pivotally connected to the ends of a link rod 41 which extends therebetween. A bell crank lever 42 is disposed below axle 14 having a rearwardly projecting arm and an outwardly projecting arm, the hub of said lever being pivoted to axle 14 about the vertical pivot 43 which may comprise a bolt or stud extending through the axle. The rearwardly extending arm of lever 42 embraces a ball 41ª extending downwardly from the link 41 and is thus connected to said link by a ball and socket joint. The outwardly extending arm of lever 42 is connected by a similar ball and socket joint to a link rod 44 which extends forwardly and is connected by a ball and socket joint to an inwardly extending arm 19ᵇ on pivot 17 carrying member 19 at the front axle.

With the described construction the operation will be as follows:

The vehicle will be drawn by another vehicle through the members 36 and 32. If the vehicle in front makes a turn, say to the right bars 32 and 36 will be swung to the right. This will rotate gear segment 32ª in a clock-wise direction, and gear 31 will be thus turned in a counter-clock-wise direction. Shaft 24 through the beveled gears 27 and 28 will be turned in a clock-wise direction and arm 23 will have its upper end swung similarly or to the rear. This will pull rearwardly on link 22, swinging member 19 clock-wise about its pivot 17, which motion will be transmitted to member 18 by link 21 so that the front wheels 20 will be swung clock-wise or to the right. These wheels will thus be turned to follow the rear wheels of the pulling vehicle. Member 19 being swung clock-wise about its pivot 17, arm 19ᵇ will have its inner end moved rearwardly and will push rearwardly on link 44 thus moving said link rearwardly and swinging bell crank lever 42 in a counter-clock-wise direction. This motion is transmitted through the rearwardly extending arm of said lever to link 41 and members 37 and 38 are thus moved in a counter-clock-wise direction, as are the rear wheels 40, said wheels thus being moved to the left. The rear wheels being so moved will cause the rear end of the vehicle to swing outwardly in a curve and to thus swing around the corner. With the described construction, therefore, the rear wheels of the trailer will be caused to turn in the direction opposite to the front wheels and will thus not cut across the corner, but as stated, will swing around the corner and clear the same.

From the above description it is seen that applicant has provided a very simple and efficient mechanism for properly steering a trailer vehicle. There is but one link connecting the mechanisms at the front and rear axles and this extends along side the machine and does not have to cross from one side of the frame to the other. The control from the draw bar to the steering mechanism is positive through the gears used. It is obvious that the device will have a high degree of utility for the purpose intended.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A steering means for a trailer vehicle having in combination with the frame, front and rear wheels of said vehicle, a draw bar pivoted adjacent one end to said frame, a segmental gear carried on said bar, a second gear meshing with said gear, a shaft carrying said second gear, a shaft journaled in said frame and extending transversely thereof, gearing connecting said shafts, members having spindles thereon journaled on vertical pivots at the ends of said front axle and having arms projecting therefrom, wheels carried on said spindles, a link connecting said arms whereby said wheels move in unison, a link connecting one of said members and said last mentioned shaft, members carrying spindles thereon journaled on the ends of said rear axle oscillatable about vertical pivots and having arms thereon, rear wheels carried on said spindles, a link connecting said last mentioned arms whereby said rear wheels will move in unison, a bell crank lever pivoted to the rear axle having one arm connected to said last mentioned link and a link connecting the other arm of said bell crank lever and an arm projecting from one of said spindle carrying members pivoted to the front axle.

2. A steering mechanism for a trailer vehicle having in combination with a frame, front and rear axles of said vehicles, members having spindles thereon pivoted to the ends of the rear axle, wheels on said spindles, means for connecting said spindles to cause said rear wheels to move in unison about the pivots of said spindles, a link connected to said means and extending forwardly at one side of the vehicle, members pivoted to the front axle about vertical pivots, wheels on said members, a member connected to said members to cause the same to move in unison, an arm on one of said members, a link connected to one end of said arm, a shaft journaled in said frame and extending transversely thereof, an arm at the outer end of said shaft to which the other end of said last mentioned link is connected, a beveled gear on the inner end of said shaft, a beveled gear meshing with said beveled gear, a vertical shaft to which said last mentioned beveled gear is secured, a spur gear secured to said vertical shaft, a segmental gear meshing with said spur gear and pivoted about a vertical axis on said frame and a draw bar rigidly connected to said segmental gear, said first mentioned link constituting the sole connection between the front and rear wheels and arranged to cause the rear wheels to move oppositely to the movement of the front wheels.

In testimony whereof I affix my signature.

JULIUS P. HARTWIG.